Jan. 3, 1956  A. H. STANTON, JR., ET AL  2,729,126
KNOB SHOES
Filed Feb. 2, 1953

INVENTORS
ARTHUR H. STANTON, JR. &
LE ISLE D. NOBLE
BY
ATTORNEY

United States Patent Office 2,729,126
Patented Jan. 3, 1956

2,729,126

KNOB SHOES

Arthur H. Stanton, Jr., Chagrin Falls, and Le Isle D. Noble, Hudson, Ohio, assignors to The Standard Parts Company, Bedford, Ohio, a corporation of Ohio Application February 2, 1953, Serial No. 334,506

3 Claims. (Cl. 81—40)

The invention relates to knob shoes. Particularly, the invention relates to an assembly providing a knob shoe whose shoe part has universal action relative to a fixed knob stem upon which the shoe is mounted so that the shoe can be adjusted to suitable contacting relation with work pieces having various surface conditions and/or variously-positioned planer or angular surfaces against which the shoe abuts.

The annexed drawing and the following description set forth in detail certain means showing the invention in knob shoes, said drawing and description illustrating, however, only one of the various forms of apparatus in which the invention may be incorporated.

Figure 3:
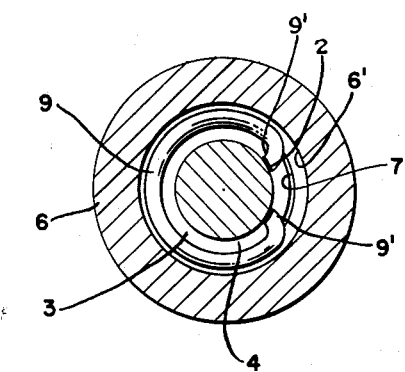
Figure 3 is a cross-section taken in the plane indicated by the line 3—3, Figure 2.

Referring to the annexed drawing in which the same parts are indicated by the same respective numbers in the several views, a hand knob 1 is pinned to and adjacent one end of an integral threaded stem 2 which has an opposite end spherical surface portion 3. The portion 3 is adapted to play on the inside face of the outer wall of a chamber 7 formed in a housing 6. A plane portion of the stem 2 includes a section 5 of reduced cross-section adjacent its opposite end portion, between which section 5 and the inner end of the spherical end portion 3 is formed a groove 4 merging into said spherical end portion 3. Thus the section 5 provides a shoulder 10 at the inner side of the groove 4 confronting the spherical end portion 3. A split resilient retaining ring 9 is aligned with and encircles the groove 4 adjacent the shoulder 10. There is also a groove 6¹ in the housing 6 confronting the groove 4, which groove 6¹ receives the split retaining ring 9; in fact, the retaining ring 9 for the greater part of its length, Figure 3, is seated in the groove 6¹, the terminals 9¹ of the split retaining ring 9 being bent inwardly so as to intersect the groove 4 and abut the shoulder 10. Preferably, the terminals 9¹ of the ring are bent radially inwardly, as shown in Figure 3.

The end spherical surface portion 3 of the stem 2 comprises an inner annular portion 3¹ of somewhat flattened formation.

Figure 1:
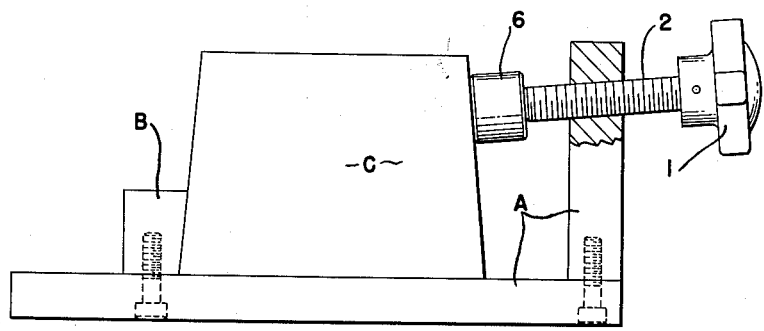
Figure 1 is an elevation showing an application of the improved knob shoe to a work piece which is mounted upon a machine tool fixture for a machining operation thereon.
Figure 2:
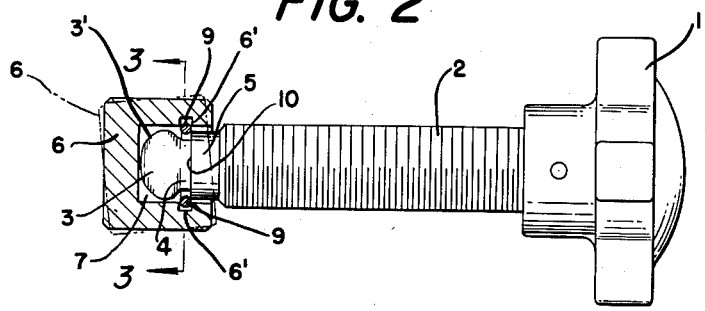
Figure 2 is an elevation, partially in axial longitudinal section, of the improved knob shoe, a tilted position of a housing member of the shoe being indicated in dot-and-dash lines.

The spherical end portion 3 of the stem 2 is pushed into the chamber 7 against the pressure of the split ring ends 9¹ which causes these ends 9¹ to be forced into the groove 6¹ to permit the end portion 3 of the stem 2 to pass into the housing 6. After the spherical end 3 of the stem 2 passes the retaining ring 9, the ends 9¹ of the latter spring back into position in the groove 4 and abut the face of the shoulder 10, as shown in Figures 2 and 3, whereby the spherical end 3 of the stem 2 is retained in the chamber 7. The size and contour of the chamber 7 is such as to loosely retain the spherical end portion 3 of the stem 2 so that the housing 6 has universal action relative to the stem 2. Thereby the exterior surface of the housing 6 which provides the shoe effect can be applied, within the limits of the universal action, against whatever character and angle of surface is provided by the work piece C, Figure 1. In this Figure 1 the stem 2 is shown as being screw-threadedly supported by a machine tool fixture "A" upon which the work piece C is mounted against an opposite fixed side stop B.

What we claim is:

1. A knob shoe having an integral stem which is threaded for feed through a support and is provided with a hand knob secured to and adjacent one end, the stem having an opposite end spherical surface portion and a portion of reduced cross-section adjacent said opposite end, the stem thence being further reduced in cross-section to provide a groove merging into said spherical end portion, the groove providing a stem shoulder adjacent the first-mentioned reduced portion and confronting said spherical end portion, a housing having an outer end wall, and having a peripheral side wall providing an inner end opening surrounding the first-mentioned reduced stem portion, an interior surface of said housing end wall being rockable upon said spherical end portion, the spherical end portion being passable through said opening and into the housing for loose accommodation of the spherical end portion therein, an interior peripheral surface of said housing side wall being provided with a groove which confronts the groove in the stem, and a split spring retaining ring seated in the housing groove and having inwardly-bent end portions normally intersecting the stem groove adjacent the stem shoulder, whereby the forcing of the spherical end portion of the stem against the ring expands the ring bent ends into the housing groove and permits passage of the spherical end portion into the housing, the expanded ends of the ring snapping back into normal inwardly-bent position in the stem groove after the passage thereby of the spherical end portion, whereby the latter is retained in the housing and the housing and stem have relative universal action.

2. A knob shoe, characterized as in claim 1, in which the stem spherical end portion has a somewhat flattened annular surface part.

3. A knob shoe, characterized as in claim 1, in which the split ring has radially-directed terminals normally intersecting the stem groove.

References Cited in the file of this patent

UNITED STATES PATENTS

| | | |
|---|---|---|
| 880,948 | Wilhelm et al. | Mar. 3, 1908 |
| 1,036,386 | Denburg | Aug. 20, 1912 |
| 2,236,913 | Merrill | Apr. 1, 1941 |
| 2,418,059 | Varcoe | Mar. 25, 1947 |
| 2,516,395 | Kerr | July 25, 1950 |
| 2,649,123 | Gulland | Aug. 18, 1953 |